United States Patent
Liu et al.

(10) Patent No.: US 11,326,217 B1
(45) Date of Patent: May 10, 2022

(54) METHOD AND SYSTEM FOR PREDICTING ADDITION AMOUNT OF SLAGGING LIME DURING LF REFINING, AND LF REFINING METHOD

(71) Applicant: University of Science and Technology Beijing, Beijing (CN)

(72) Inventors: Qing Liu, Beijing (CN); Zicheng Xin, Beijing (CN); Jiangshan Zhang, Beijing (CN); Junguo Zhang, Beijing (CN); Chunhui Zhang, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 0 days.

(21) Appl. No.: 17/478,880

(22) Filed: Sep. 18, 2021

(30) Foreign Application Priority Data

Nov. 10, 2020 (CN) .......................... 202011257172.9

(51) Int. Cl.
*C21C 7/00* (2006.01)
(52) U.S. Cl.
CPC ..................................... *C21C 7/00* (2013.01)
(58) Field of Classification Search
CPC ....................................................... C21C 7/00
See application file for complete search history.

(56) References Cited

U.S. PATENT DOCUMENTS 4,551,175 A * 11/1985 Agrawal ............... C21C 7/0087
75/384

FOREIGN PATENT DOCUMENTS

| CN | 103397140 A |   | 11/2013 |
|----|-------------|---|---------|
| CN | 103866088 A |   | 6/2014  |
| CN | 105838846 A | * | 8/2016  |
| JP | 6014574 B2  | * | 10/2016 |

* cited by examiner

*Primary Examiner* — Scott R Kastler
(74) *Attorney, Agent, or Firm* — Bayramoglu Law Offices LLC

(57) ABSTRACT

A method and system for predicting an addition amount of slagging lime during ladle furnace (LF) refining, and an LF refining method are provided. The method includes: S1: calculating an actual sulfur distribution ratio in combination with a Kungliga Tekniska Högskolan (KTH) model and a least square method by using LF refining parameters; S2: calculating, according to a principle of sulfur mass conservation, a mass of final slag by using the LF refining parameters and the actual sulfur distribution ratio obtained in S1; and S3: calculating, according to a principle of material conservation during LF refining, an addition amount of slagging lime during the LF refining by using the LF refining parameters and the mass of the final slag obtained in S2, thereby predicting the addition amount of the required slagging lime.

3 Claims, 2 Drawing Sheets

---

Calculate an actual sulfur distribution ratio in combination with a KTH model and a least square method Calculate a mass of final slag according to a principle of sulfur mass conservation Obtain an addition amount of lime during refining

METHOD AND SYSTEM FOR PREDICTING ADDITION AMOUNT OF SLAGGING LIME DURING LF REFINING, AND LF REFINING METHOD

CROSS REFERENCE TO THE RELATED APPLICATIONS

This application is based upon and claims priority to Chinese Patent Application No. 202011257172.9, filed on Nov. 10, 2020, the entire contents of which are incorporated herein by reference.

TECHNICAL FIELD

The present disclosure relates to the technical field of ferrous metallurgy, and in particular, to a method and system for predicting an addition amount of slagging lime during ladle furnace (LF) refining, and an LF refining method.

BACKGROUND

With the development of steel-making technologies, secondary refining also plays a vital role in the steel-making process. The LF is widely applied to steelmaking workshop because of its advantages such as the small equipment investment, flexible operation and desirable refining effect. Due to complex physicochemical reactions during refining, existing steel plants control an addition amount of the slagging material mainly by the continuous sampling and the operational experience of field operators, which causes the large component fluctuation and unstable quality of molten steel, wastes materials, and seriously affects the improvement of production efficiency of the LF and the advancement of full-process intelligent manufacturing technologies of the steel plants. For example, the patent CN201410111982.1 provides a method for determining an addition amount of a slagging material and a deoxidation alloy of an LF with a reference heat method. Hence, the research and development of modeling on the addition amount of the slagging material during LF refining becomes particularly significant under the circumstance of advancing intelligent manufacturing in steel industry.

Presently, researches on slagging during the LF refining mainly focus on analysis of the slag system with respect to optimization and sulfur removal mechanisms. During the LF refining, influences of converter tapping slag and casting residue need to be considered. Moreover, due to the complex and uncontrollable reactions during the metallurgical process, it is difficult to use a single metallurgical mechanism model to realize the effective control on the addition amount of the slagging lime during the LF refining. Therefore, it is essential to research a method for predicting the addition amount of the slagging lime during the LF refining with strong adaptation and accurate calculation to solve the existing actual problems of the steel plants.

SUMMARY

In view of this, the present disclosure provides a method and system for predicting an addition amount of slagging lime during LF refining, and an LF refining method, to solve the above problems of existing steel plants. The present disclosure provides a model to predict the addition amount of lime for desulfuration during LF refining with strong adaptation and accurate calculation in combination with mechanism analysis and historical data analysis by fully mining actual data information of a production field. It can calculate an actual sulfur distribution ratio and a mass of final slag according to components of molten steel, components of slag, a mass of the molten steel and a mass of the slag during refining, and thus calculate the addition amount of the lime during LF refining quickly and accurately, thereby stabilizing the components of the molten steel, saving materials, improving the production efficiency of the LF, and advancing full-process intelligent manufacturing technologies of steel plants.

According to a first aspect of the present disclosure, a method for predicting an addition amount of slagging lime during LF refining is provided, which may specifically include the following steps:

S1: calculating an actual sulfur distribution ratio in combination with a Kungliga Tekniska Högskolan (KTH) model and a least square method by using LF refining parameters;

S2: calculating a mass of final slag according to a principle of sulfur mass conservation by using the LF refining parameters and the actual sulfur distribution ratio obtained in S1; and S3: calculating, according to a principle of material conservation during LF refining, an addition amount of slagging lime during the LF refining by using the LF refining parameters and the mass of the final slag obtained in S2, thereby predicting the addition amount of the required slagging lime.

Further, S1 may specifically include: calculating the actual sulfur distribution ratio in combination with the KTH model and the least square method by using a mass percent of each component in target slag and a mass percent of each component in target molten steel during the LF refining.

Further, the actual sulfur distribution ratio may be calculated with the following steps:

defining a formula for a sulfur distribution ratio, as shown in Formula (1):

$$L_S = \frac{w(S)}{w[S]} \quad (1)$$

where, $w[S]$ denotes a mass percent of sulfur in the molten steel, in unit of %; $w(S)$ denotes a mass percent of sulfur in the slag, in unit of %; and $L_S$ denotes the sulfur distribution ratio;

denoting a sulphide capacity with Formula (2) in the KTH model:

$$C_S = \exp\left\{-\frac{\Delta G^\theta}{RT}\right\} \cdot \left\{-\frac{a_{o^{2-}}}{f_{s^{2-}}}\right\} = \exp\left\{-\frac{\Delta G^\theta}{RT}\right\} \cdot \exp\left\{-\frac{\zeta}{RT}\right\} \quad (2)$$

where, $C_s$ denotes the sulphide capacity; $\Delta G^\theta$ denotes Gibbs free energy and is indicated as $\Delta G^\theta = 118535 - 58.8157 \cdot T$ (J/mol); R denotes gas constant and is 8.314 (J/mol·K); and $\zeta$ denotes a function of a single component with respect to a temperature in case of no interaction between components;

defining a relation between a steel-slag sulfur equilibrium distribution ratio $L_S'$ and $C_s$, as shown in Formula (3):

$$lgL_S' = lg\frac{w(S)}{w[S]} = -\frac{935}{T} + 1.375 + lgf_S + lgC_S - lga_{[O]} \quad (3)$$

where, $L_S'$ denotes a sulfur distribution ratio calculated with the KTH model; T denotes a temperature, in unit of K; $f_s$ denotes an activity coefficient of sulfur in the molten steel; $C_s$ denotes the sulphide capacity; and $a_{[O]}$ denotes an activity of oxygen in the molten steel; and correcting, by using the least square method, the sulfur distribution ratio calculated with the KTH model to obtain an actual sulfur distribution ratio formula, as shown in Formula (4):

$$L_S = a + bR + cMI + dL_S' \tag{4}$$

where, $L_S$ denotes the actual sulfur distribution ratio; R denotes a basicity of the furnace slag; MI denotes a Mannesmann index of the furnace slag; a denotes a constant term; b denotes a weight coefficient of the basicity; c denotes a weight coefficient of the Mannesmann index; and d denotes a weight coefficient of the sulfur distribution ratio calculated by the KTH model.

Further, S2 may specifically include: calculating, according to the principle of sulfur mass conservation that a decreased amount of the sulfur in the molten steel equals to an increased amount of the sulfur in the slag, the mass of the final slag in combination of a mass percent of each component in initial molten steel, a mass percent of each component in the target molten steel, a mass percent of each component in the final slag, a mass percent and a mass of each component in casting residue, a mass percent and a mass of each component in converter tapping slag, a mass of the molten steel and the actual sulfur distribution ratio obtained in S1.

Further, a final slag mass calculation model may include:

$$(w[S]_0 - w[S]) \cdot G_m = w(S) \cdot M_z - w(S)_h \cdot M_h - w(S)_c \cdot M_c \tag{5}$$

where, $w[S]_0$ is a mass percent of sulfur in the initial molten steel, in unit of %; $w[S]$ is a mass percent of sulfur in the molten steel at a smelting endpoint, in unit of %; $w(S)$ is a mass percent of sulfur in the final slag, in unit of %; $w(S)_h$ is a mass percent of sulfur in the casting residue, in unit of %; $w(S)_c$ is a mass percent of sulfur in the converter tapping slag, in unit of %; $G_m$ is the mass of the molten steel, in unit of kg; $M_z$ is the mass of the final slag, in unit of kg; $M_h$ is a mass of the casting residue, in unit of kg; and $M_c$ is a mass of the converter tapping slag, in unit of kg; and substituting Formula (1) into Formula (5) to obtain a final slag mass calculation formula, as shown in Formula (6):

$$M_z = \frac{(w[S]_0 - w[S]) \cdot G_m + w(S)_h \cdot M_h + w(S)_c \cdot M_c}{w[S] \cdot L_S} \tag{6}$$

Further, S3 may specifically include: respectively obtaining, according to the principle of material conservation during the LF refining by using the LF refining parameters and the mass of the final slag obtained in S2, a mass $M_1$ of lime required to remove the sulfur from the molten steel, a calculated mass $M_2$ of lime required to adjust a basicity of refining slag and a calculated mass $M_3$ of lime required to reach the mass of the final slag, and adding the $M_1$, the $M_2$ and the $M_3$, to obtain the addition amount M of the slagging lime during the LF refining, thereby predicting the addition amount of the required slagging lime.

Further, owing to elemental mass conservation before and after sulfur removal, the mass $M_1$ of the lime required to remove the sulfur from the molten steel may be obtained from the following Formula (7):

$$M_1 \cdot (\% \text{ CaO})/56 = G_m(w[S]_0 - w[S])/32 \tag{7}$$

according to a basic basicity calculation formula, the calculated mass $M_2$ of the lime required to adjust the basicity of the refining slag may be obtained from the following Formula (8):

$$R_1 = \frac{M_c(\%CaO)_c + (M_1 + M_2 + M_y) \cdot (\%CaO) + M_l(\%CaO)_l + M_h(\%CaO)_h}{M_c(\%SiO_2)_c + M_l(\%SiO_2)_l + M_h(\%SiO_2)_h + M_{Si}} \tag{8}$$

according to the principle of material conservation, the calculated mass $M_3$ of the lime required to reach the mass of the final slag may be obtained from the following Formula (9):

$$M_z(\% \text{ CaO})_z = M_3(\% \text{ CaO}) + [(M_1 + M_2 + M_y) \cdot (\% \text{ CaO})] + M_c(\% \text{ Cao})_c + M_h(\% \text{ CaO})_h + M_l(\% \text{ Cao})_l \tag{9 and}$$

adding the $M_1$, the $M_2$ and the $M_3$ to obtain the addition amount M of the slagging lime during the LF refining from the following Formula (10), thereby completing prediction:

$$M = M_1 + M_2 + M_3 \tag{10}$$

where, (% CaO) is a mass percent of CaO in the lime, in unit of %; $M_1$ is the mass of the lime required to remove the sulfur from the molten steel, in unit of kg; $G_m$ is the mass of the molten steel, in unit of kg; $M_2$ is the calculated mass of the lime required to adjust the basicity of the refining slag, in unit of kg; $M_l$ is a mass of pre-melting refining slag added during tapping, in unit of kg; $M_y$ is a mass of lime added during the tapping, in unit of kg; $M_h$ is the mass of the casting residue, in unit of kg; $M_c$ is the mass of the converter tapping slag, in unit of kg; $M_3$ is the calculated mass of the lime required to reach the mass of the final slag, in unit of kg; $M_{Si}$ is a mass of silicon dioxide generated during ferrosilicon deoxidation, in unit of kg; (% CaO)$_c$ is a mass percent of CaO in the converter tapping slag, in unit of %; (% CaO)$_l$ is a mass percent of CaO in the pre-melting refining slag added during the tapping, in unit of %; (% CaO)$_h$ is a mass percent of CaO in the casting residue, in unit of %; (% CaO)$_z$ is a mass percent of CaO in the final slag, in unit of %; (% SiO$_2$)c is a mass percent of SiO$_2$ in the converter tapping slag, in unit of %; (% SiO$_2$)$_l$ is a mass percent of SiO$_2$ in the pre-melting refining slag added during the tapping, in unit of %; (% SiO$_2$)$_h$ is a mass percent of SiO$_2$ in the casting residue, in unit of %; and $R_1$ is a basicity of target refining slag and is calculated by thermodynamic simulation.

According to a second aspect of the present disclosure, a system for predicting an addition amount of slagging lime during LF refining is provided, which may include:

an actual sulfur distribution ratio calculation module, configured to calculate an actual sulfur distribution ratio in combination with a KTH model and a least square method by using LF refining parameters;

a final slag mass calculation module, configured to calculate a mass of final slag according to a principle of sulfur mass conservation by using the LF refining parameters and the actual sulfur distribution ratio obtained in S1; and a lime addition amount prediction module, configured to calculate, according to a principle of material conservation during LF refining, an addition amount of slagging lime during the LF refining by using the LF refining parameters and the mass of the final slag obtained in S2, thereby predicting the addition amount of the required slagging lime.

According to a third aspect of the present disclosure, an LF refining method is provided, which may include the following steps:

S1: acquiring initial parameters of LF refining;

S2: pre-processing the initial parameters, and correcting error data therein;

S3: predicting an addition amount of required slagging lime by using the prediction method in the first aspect of the present disclosure;

S4: starting the LF refining according to a prediction result, and continuously acquiring refining parameters during refining; and S5: determining whether a mass percent of sulfur in molten steel at a refining endpoint is qualified;

if the mass percent of the sulfur is qualified, performing a wire-feeding operation till completion of the LF refining; and if the mass percent of the sulfur is unqualified, iterating refining parameters at the refining endpoint to the parameters in S1 to take as new initial parameters, and repeating the above steps.

Further, the parameters may include: inbound parameters, outbound parameters and production parameters;

the inbound parameters may include a mass percent of each component in inbound molten steel, a mass of molten steel, a mass percent of each component in converter tapping slag, a mass of the converter tapping slag, a mass percent of each component in casting residue, and a mass of the casting residue;

the outbound parameters may include a mass percent of each component in target molten steel, and a mass percent of each component in target slag; and the production parameters may include a mass percent of each component in lime, and a mass of the lime.

Compared with the prior art, the method and system for predicting an addition amount of slagging lime during LF refining, and the LF refining method provided by the present disclosure have the following advantages:

The present disclosure calculates an actual sulfur distribution ratio, a mass of final slag, and an addition amount of lime required for slagging during the LF refining, and provides a novel model construction method for an LF refining system that lacks a slagging model. The present disclosure constructs a model to predict the addition amount of lime for desulfuration during LF refining in combination with metallurgical mechanism analysis and big data processing. The slagging sulfur-removal lime addition amount predicted by the model has a required deviation of within 20% for lime added at a time and a mass percent of successfully hit endpoint S, and can be well applied to prediction of the addition amount of the lime in which the mass percent of the target sulfur is 0.004%-0.005%. While saving the production cost and improving the accuracy of process operation, the construction of the model reduces the labor intensity and further improves the LF refining efficiency.

BRIEF DESCRIPTION OF THE DRAWINGS

The accompanying drawings described herein are provided for further understanding of the present disclosure, and constitute a part of the present disclosure. The exemplary examples and illustrations of the present disclosure are intended to explain the present disclosure, but do not constitute inappropriate limitations to the present disclosure.

In the drawings.

DETAILED DESCRIPTION

Descriptions will now be made in detail to exemplary examples, instances of which are illustrated in the accompanying drawings. The following description refers to the accompanying drawings in which the same numbers in different drawings represent the same or similar elements unless otherwise represented. The implementations set forth in the following description of exemplary examples do not represent all implementations consistent with the present disclosure. Instead, they are merely examples of apparatuses and methods consistent with aspects related to the present disclosure as recited in the appended claims.

It should be noted that the terms "first", "second", and so on in the description and claims of the present disclosure are intended to distinguish between similar objects but do not necessarily indicate a specific order or sequence. It should be understood that data used in such a way may be interchangeable in a certain case, such that the examples of the present invention described here can be implemented in an order other than those illustrated or described here. Moreover, the terms "include", "have", and any other variants mean to cover the non-exclusive inclusion, for example, a process, method, system, product, or device that includes a list of steps or units is unnecessarily limited to those steps or units, but may include other steps or units not expressly listed or inherent to such a process, method, system, product, or device.

The term "multiple" means to involve two or more things.

It should be understood that the term "and/or" used in the present disclosure merely describes an association relationship between associated objects, indicating that there may be three kinds of relationships. For example, A and/or B may indicate three cases: the A exists alone, both the A and the B coexist, and the B exists alone.

Figure 1:
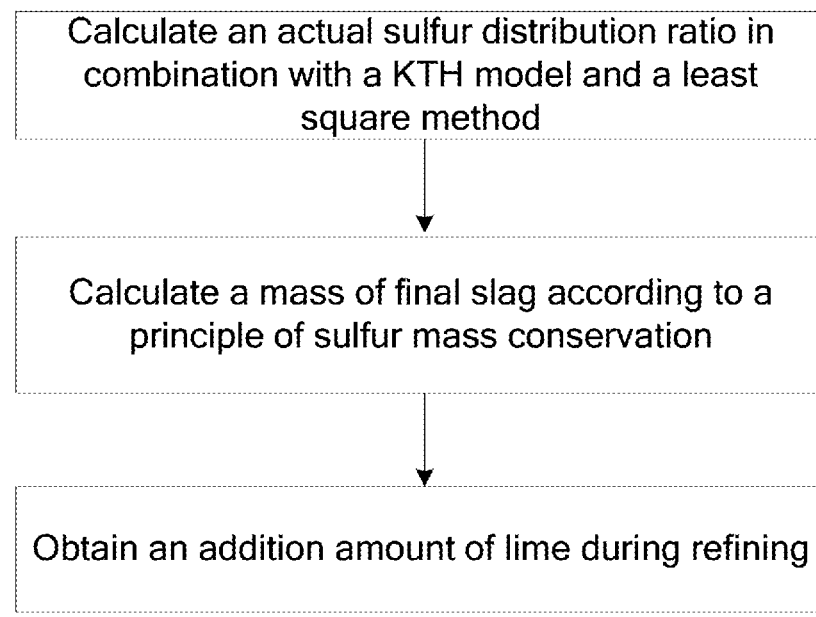
FIG. 1 is a flow chart of a method for predicting an addition amount of slagging lime during LF refining according to the present disclosure.

As shown in FIG. 1, the present disclosure provides the method for predicting the addition amount of slagging lime during LF refining. The method may include the following steps:

S1: Obtain the actual sulfur distribution ratio calculation model with the KTH model as a basis in combination with the mass percent of each component in the target slag system and the mass percent of each component in target molten steel during LF refining, where, the KTH model developed by the department of metallurgy from the Kungliga Tekniska Högskolan is configured to calculate the sulphide capacity of the multi-component slag system at different temperatures.

S2: Obtain the final slag mass calculation model according to the principle of S mass conservation in combination of the mass percent of each component in initial molten steel, the mass percent of each component in the target molten steel, the mass percent of each component in final slag, the mass percent and the mass of each component in casting residue, the mass percent and the mass of each component in converter tapping slag, the mass of molten steel and the actual sulfur distribution ratio.

S3: Obtain the refining sulfur-removal lime addition amount calculation model according to the principle of material conservation during refining, thereby predicting an addition amount of lime required during the LF refining.

Figure 2:
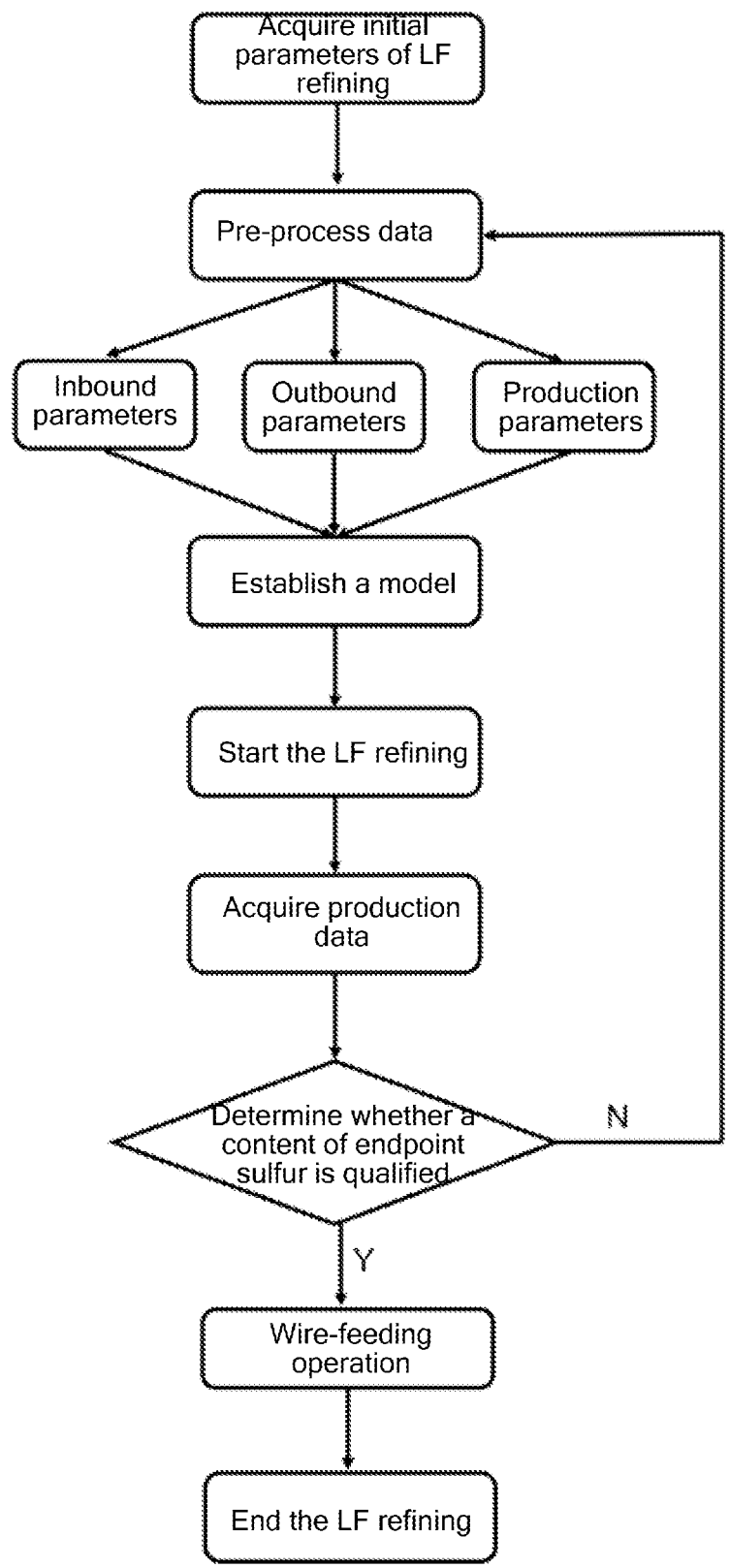
FIG. 2 is a flow chart of an LF refining method according to the present disclosure.

As shown in FIG. 2, in actual applications, the lime addition amount model of the method is applied with the following steps:

S1: Acquire initial parameters of LF refining.

Acquire inbound parameters during the LF refining, the inbound parameters including the mass percent of each component in inbound molten steel, the mass of molten steel, the mass percent of each component in converter tapping slag, the mass of the converter tapping slag, the mass percent of each component in casting residue, and the mass of the casting residue.

Acquire outbound parameters during the LF refining, the outbound parameters including the mass percent of each component in target molten steel, and the mass percent of each component in the target slag system.

Acquire production parameters during the LF refining, the production parameters including the mass percent of each component in lime and the mass of the lime.

(2) Pre-process historical data, and remove abnormal data caused by the system reason or the artificial reason in the production report.

(3) Establish the model to predict the addition amount of lime for slagging sulfur-removal according to the inbound parameters, the outbound parameters and the production parameters of the LF refining in the pre-processed initial parameters.

(4) Restart smelting according to the established the model to predict the addition amount of lime for slagging sulfur-removal, and acquire refining parameters in real time.

(5) Test components of molten steel when the smelting is close to an endpoint, and determine whether the mass percent of endpoint sulfur of the molten steel is qualified. If yes, execute the next step of the wire-feeding operation till completion of the LF refining; and if no, iterate refining parameters at this time to S1 to calibrate the the model to predict the addition amount of lime for slagging sulfur-removal.

For the actual sulfur distribution ratio calculation model in S1, the actual sulfur distribution ratio calculation model is established in combination with the mass percent of each component in the target slag system and the mass percent of each component in the target molten steel during the LF refining by using the big data mining method on the basis of analysis on field actual data, as shown in Formulas (1)-(3):

Define the formula for the sulfur distribution ratio, as shown in Formula (1):

$$L_S = \frac{w(S)}{w[S]} \quad (1)$$

where, $w[S]$ denotes the mass percent of sulfur in the molten steel, in unit of %; $w(S)$ denotes the mass percent of sulfur in the slag, in unit of %; and $L_S$ denotes the sulfur distribution ratio.

Denote the sulphide capacity with Formula 2 in the KTH model:

$$C_S = \exp\left\{-\frac{\Delta G^\theta}{RT}\right\} \cdot \left\{\frac{a_{o2}}{f_{s2-}}\right\} = \exp\left\{-\frac{\Delta G^\theta}{RT}\right\} \cdot \exp\left\{-\frac{\zeta}{RT}\right\} \quad (2)$$

where, $C_s$ denotes the sulphide capacity; $\Delta G^\theta$ denotes Gibbs free energy and is indicated as $\Delta G^\circ = 118535 - 58.8157 \cdot T$ (J/mol); R denotes gas constant and is 8.314 (J/mol·K); and $\zeta$ denotes the function of the single component with respect to the temperature in case of no interaction between components.

Define the relation between the steel-slag sulfur equilibrium distribution ratio $L_S'$ and Cs, as shown in Formula (3):

$$lg L_S' = lg\frac{w(S)}{w[S]} = -\frac{935}{T} + 1.375 + lg f_S + lg C_S - lg a_{[O]} \quad (3)$$

where, $L_S'$ denotes the sulfur distribution ratio calculated with the KTH model; T denotes the temperature, in unit of K; $f_s$ denotes the activity coefficient of the sulfur in the molten steel; $C_s$ denotes the sulphide capacity; and $a_{[O]}$ denotes the activity of oxygen in the molten steel.

Optimize the model based on the KTH model according to the field actual data to obtain the following Formula (4)

$$L_S = -224.543 + 54.947 \cdot R + 3359.397 \cdot MI - 4.544 L_S' \quad (4)$$

where, $L_S$ denotes the actual sulfur distribution ratio; R denotes the basicity of the furnace slag, with the application range of 3.33-4.58; and MI denotes the Mannesmann index of the furnace slag, with an application range of 0.13-0.31.

In S2, establish the final slag mass calculation model according to the principle of S mass conservation in combination of the mass percent of each component in the initial molten steel, the mass percent of each component in the target molten steel, the mass percent of each component in the final slag, the mass percent and the mass of each component in the casting residue, the mass percent and the mass of each component in the converter tapping slag, the mass of the molten steel and the actual sulfur distribution ratio, as shown in Formula (5) and Formula (6):

$$(w[S]_0 - w[S]) \cdot G_m = w(S) \cdot M_z - w(S)_h \cdot M_h - w(S)_c \cdot M_c \quad (5)$$

where, $w[S]_0$ is the mass percent of sulfur in the initial molten steel, in unit of %; $w[S]$ is the mass percent of sulfur in the molten steel, in unit of %; $w(S)$ is the mass percent of sulfur in the final slag, in unit of %; $w(S)_h$ is the mass percent of sulfur in the casting residue, in unit of %; $w(S)_c$ is the mass percent of sulfur in the converter tapping slag, in unit of %; $G_m$ is the mass of the molten steel, in unit of kg; $M_z$ is the mass of the final slag, in unit of kg; $M_h$ is the mass of the casting residue, in unit of kg; and $M_c$ is the mass of the converter tapping slag, in unit of kg.

Substituting Formula (1) into Formula (5) to obtain the final slag mass calculation formula, as shown in Formula (6):

$$M_z = \frac{(w[S]_0 - w[S]) \cdot G_m + w(S)_h \cdot M_h + w(S)_c \cdot M_c}{w[S] \cdot L_S} \quad (6)$$

In S3, establish the refining sulfur-removal lime addition amount calculation model according to the principle of material conservation during the refining in combination with the mass percent of each component in the initial molten steel, the mass percent of each component in the target molten steel, the mass of the molten steel, the mass percent of CaO in lime, the mass percent of each component in the casting residue, the mass of the casting residue, the mass percent of each component in the converter tapping slag, and the mass of the converter tapping slag, as shown in the following formula:

$$\begin{cases} M_1 \cdot (\%CaO) = G_m(w[S]_0 - w[S])56/32 \\ M_c(\%CaO)_c + (M_1 + M_2 + M_y) \cdot (\%CaO) + \\ \quad \dfrac{M_l(\%CaO)_l + M_h(\%CaO)_h}{(M_c + M_1 + M_2 + M_3 + M_4 + M_h + M_{Si} + M_{CaF_2})} \\ R_1 = \dfrac{M_c(\%SiO_2)_c + M_l(\%SiO_2)_l + M_h(\%SiO_2)_h + M_{Si}}{(M_c + M_1 + M_2 + M_3 + M_4 + M_h + M_{Si} + M_{CaF_2})} \\ M_3(\%CaO) = M_z(\%CaO)_z - [(M_1 + M_2 + M_y) \cdot (\%CaO)] \\ \quad - M_c(\%CaO)_c - M_h(\%CaO)_h - M_l(\%CaO)_l \\ M = M_1 + M_2 + M_3 \end{cases}$$

where, (% CaO) is the mass percent of the CaO in the lime, in unit of %; $M_1$ is the mass of lime required to remove the sulfur from the molten steel, in unit of t; $G_m$ is the mass of the molten steel, in unit of kg; $M_2$ is the calculated mass of lime required to adjust the basicity of the refining slag, in unit of kg; $M_l$ is the mass of pre-melting refining slag added during tapping, in unit of kg; $M_y$ is the mass of lime added during the tapping, in unit of kg; $M_h$ is the mass of the casting residue, in unit of kg; Mc is the mass of the converter tapping slag, in unit of kg; $M_3$ is the calculated mass of lime required to reach the mass of the final slag, in unit of kg; $M_4$ is the mass of steel shot aluminum added during the tapping, in unit of kg; $M_{Si}$ is the mass of silicon dioxide generated during ferrosilicon deoxidation, in unit of kg; $M_{CaF2}$ is the mass of fluorite, in unit of kg: $(\%\,CaO)_c$ is the mass percent of CaO in the converter tapping slag, in unit of %; $(\%\,CaO)_l$ is the mass percent of CaO in the pre-melting refining slag added during the tapping, in unit of %; $(\%\,CaO)_h$ is the mass percent of CaO in the casting residue, in unit of %; $(\%\,CaO)_z$ is the mass percent of CaO in the final slag, in unit of %; (% $SiO_2$)c is the mass percent of $SiO_2$ in the converter tapping slag, in unit of %; $(\%\,SiO_2)_l$ is the mass percent of $SiO_2$ in the pre-melting refining slag added during the tapping, in unit of %; $(\%\,SiO_2)_h$ is the mass percent of $SiO_2$ in the casting residue, in unit of %; and $R_1$ is the basicity of target refining slag and is calculated by thermodynamic simulation. The mass of the required lime that is calculated through the above model is used to guide the addition of the lime in actual production based on the anticipated mass percent of the endpoint sulfur of the molten steel.

Example

With SS400 steel produced by the 150 t LF of some steel plant as the implementation carrier, when the LF refining starts, the addition amount of lime is calculated with the refining sulfur-removal lime addition amount calculation model according to inbound parameters, production parameters and outbound parameters during the LF refining. Table 1 shows the mass percent of each component in the target slag system of the SS400 steel, with the relevant experimental data as shown in Table 2. As can be seen from experimental results, the slagging sulfur-removal lime addition amount predicted by the model has the required deviation of within 20% for lime added at a time and the mass percent of successfully hit endpoint S, and can be well applied to prediction of the addition amount of the lime in which the mass percent of the target sulfur is 0.004%-0.005%.

TABLE 1

| Mass percent of each component in the target slag system of the SS400 steel, % | | | | |
|---|---|---|---|---|
| Slag component | CaO | $SiO_2$ | MgO | $Al_2O_3$ |
| Mass percent of each component | 50-55 | 12-15 | 5-8 | 15-25 |

TABLE 2

| Experimental results after implementation of the present disclosure | | | | | | | | | | |
|---|---|---|---|---|---|---|---|---|---|---|
| Example | Mass percent of initial sulfur in molten steel $w[s]_0$/% | Molten steel amount/kg | Balance in rotary casting/kg | Actual calculated Ls | M1/kg | M2/kg | M3/kg | W[s]actual measured value/% | w[s] Target value/% | Addition amount of lime M/kg |
| 1 | 0.018 | 158000 | 3000 | 277.3 | 44 | 16 | 507 | 0.0040 | 0.0040 | 566 |
| 2 | 0.017 | 161000 | 3000 | 272.5 | 41 | 11 | 471 | 0.0032 | 0.0040 | 524 |
| 3 | 0.018 | 156000 | 3000 | 275.5 | 43 | 16 | 515 | 0.0038 | 0.0040 | 574 |
| 4 | 0.02 | 153000 | 2000 | 257.9 | 48 | 33 | 658 | 0.0035 | 0.0040 | 739 |
| 5 | 0.019 | 160000 | 2000 | 254.5 | 47 | 27 | 671 | 0.0034 | 0.0040 | 745 |
| 6 | 0.02 | 153000 | 3500 | 290.2 | 48 | 25 | 543 | 0.0045 | 0.0050 | 616 |
| 7 | 0.025 | 153000 | 3000 | 306.4 | 63 | 12 | 645 | 0.0043 | 0.0050 | 721 |
| 8 | 0.021 | 153000 | 3000 | 287.2 | 51 | 18 | 581 | 0.0048 | 0.0050 | 650 |
| 9 | 0.032 | 158000 | 1500 | 321.0 | 87 | 23 | 900 | 0.0042 | 0.0050 | 1010 |
| 10 | 0.021 | 155000 | 2000 | 264.8 | 52 | 36 | 680 | 0.0046 | 0.0050 | 768 |

It is to be noted that the terms "include", "contain" or any other variations thereof are intended to cover a non-exclusive inclusion, such that a process, method, article or equipment including a series of elements not only includes those elements, but also includes those elements that are not explicitly listed, or includes elements inherent to such a process, method, article or device. Under the condition of no more limitations, it is not excluded that additional identical elements further exist in the process, method, article or device including elements defined by a sentence "including a . . . ".

The serial numbers of the examples of the present disclosure are merely for description and do not represent the preference of the examples.

The examples of the present disclosure have been described above with reference to the accompanying drawings, but the present disclosure is not limited to the foregoing specific examples. The foregoing specific examples are only illustrative and not restrictive. Under the inspiration of the present disclosure, those of ordinary skill in the art can make many improvements without departing from the purpose of the present disclosure and the protection scope defined by the claims, and these improvements shall fall within the protection scope of the present disclosure.

The invention claimed is:

1. A system for predicting an addition amount of a slagging lime during a ladle furnace (LF) refining, wherein the system comprises:
   an actual sulfur distribution ratio calculation module, configured to calculate an actual sulfur distribution ratio in combination with a Kungliga Tekniska Högskolan (KTH) model and a least square method by using LF refining parameters, wherein the LF refining parameters comprise a mass percent of each component in a target slag and a mass percent of each component in a target molten steel during LF refining;
   a final slag mass calculation module, configured to calculate a mass of a final slag according to a principle of sulfur mass conservation by using the LF refining parameters and the actual sulfur distribution ratio; and
   a lime addition amount prediction module, configured to calculate, according to a principle of material conservation during the LF refining, the addition amount of the slagging lime during the LF refining by using the LF refining parameters and a mass of a final slag, thereby predicting the addition amount of the slagging lime, wherein the mass of the final slag is obtained by using the LF refining parameters and the actual sulfur distribution ratio;
   wherein the system uses a method for predicting the addition amount of the slagging lime during the ladle furnace (LF) refining, comprising:
   calculating the actual sulfur distribution ratio in combination with the Kungliga Tekniska Högskolan (KTH) model and the least square method by using the LF refining parameters;
   calculating the mass of the final slag by using the LF refining parameters and the actual sulfur distribution ratio; and
   calculating the addition amount of the slagging lime during the LF refining by using the LF refining parameters and the mass of the final slag, thereby predicting the addition amount of the slagging lime;
   the actual sulfur distribution ratio is calculated with the following steps:
   defining a formula for a sulfur distribution ratio, as shown in Formula (1):

$$L_S = \frac{w(S)}{w[S]}, \qquad (1)$$

wherein, w[S] denotes a mass percent of sulfur in a molten steel, in unit of %; w(S) denotes a mass percent of sulfur in a slag, in unit of %; and $L_S$ denotes the sulfur distribution ratio;
   denoting a sulphide capacity with Formula (2) in the KTH model:

$$C_S = \exp\left\{-\frac{\Delta G^\theta}{RT}\right\} \cdot \left(\frac{a_{o^{2-}}}{f_{s^{2-}}}\right) = \exp\left\{-\frac{\Delta G^\theta}{RT}\right\} \cdot \exp\left\{-\frac{\zeta}{RT}\right\}, \qquad (2)$$

wherein, $C_s$ denotes the sulphide capacity; $\Delta G^\theta$ denotes Gibbs free energy and is indicated as $\Delta G^\theta = 118535 - 58.8157 \cdot T$, in unit of J/mol; R denotes gas constant and is 8.314 (J/mol·K); $\zeta$ denotes a function of a single component with respect to a temperature in case of no interaction between components; $f_{s^{2-}}$ denotes an activity coefficient of sulfur in the slag; and $a_{o^{2-}}$ denotes an activity of oxygen in the slag;
   defining a relation between a steel-slag sulfur equilibrium distribution ratio $L_S'$ and Cs, as shown in Formula (3):

$$lg L_S' = lg\frac{w(S)}{w[S]} = -\frac{935}{T} + 1.375 + lg f_S + lg C_s - lg a_{[O]}, \qquad (3)$$

wherein, $L_S'$ denotes a sulfur distribution ratio calculated with the KTH model; T denotes the temperature, in unit of K; $f_s$ denotes an activity coefficient of sulfur in the molten steel; $C_s$ denotes the sulphide capacity; and $a_{[O]}$ denotes an activity of oxygen in the molten steel; and
   correcting, by using the least square method, the sulfur distribution ratio calculated with the KTH model to obtain an actual sulfur distribution ratio calculation formula, as shown in Formula (4):

$$L_S = a + bR + cMI + dL_S' \qquad (4),$$

wherein, $L_S$ denotes the sulfur distribution ratio; R denotes a basicity of a furnace slag; MI denotes a Mannesmann index of the furnace slag; a denotes a constant term; b denotes a weight coefficient of the basicity; c denotes a weight coefficient of the Mannesmann index; and d denotes a weight coefficient of the sulfur distribution ratio calculated by the KTH model;
   wherein calculating the mass of the final slag by using the LF refining parameters and the actual sulfur distribution ratio comprises: calculating, according to a principle of sulfur mass conservation that a decreased amount of the sulfur in the molten steel equals to an increased amount of the sulfur in the slag, the mass of the final slag in combination of a mass percent of each component in an initial molten steel, the mass percent of each component in the target molten steel, a mass percent of each component in the final slag, a mass percent and a mass of each component in a casting residue, a mass percent and a mass of each component in a converter tapping slag, a mass of the molten steel and the actual sulfur distribution ratio;
   a final slag mass calculation model comprises:

$$(w[S]_0 - w[S]) \cdot G_m = w(S) \cdot M_z - w(S)_h \cdot M_h - w(S)_c \cdot M_c \qquad (5),$$

wherein, $w[S]_0$ is a mass percent of sulfur in the initial molten steel, in unit of %; w[S] is the mass percent of sulfur in the molten steel at a smelting endpoint, in unit of %; w(S) is the mass percent of sulfur in the final slag, in unit of %; $w(S)_h$ is a mass percent of sulfur in the casting residue, in unit of %; $w(S)_c$ is a mass percent of sulfur in the converter tapping slag, in unit of %; $G_m$ is the mass of the molten steel, in unit of kg; $M_z$ is the mass of the final slag, in unit of kg; $M_h$ is a mass of the casting residue, in unit of kg; and $M_c$ is a mass of the converter tapping slag, in unit of kg; and
   substituting the Formula (1) into the Formula (5) to obtain a final slag mass calculation formula, as shown in Formula (6):

$$M_z = \frac{(w[S]_0 - w[S]) \cdot G_m + w(S)_h \cdot M_h + w(S)_c \cdot M_c}{w[S] \cdot L_S};\qquad(6)$$

respectively obtaining, according to a principle of material conservation during the LF refining by using the LF refining parameters and the mass of the final slag, a mass $M_1$ of lime required to remove the sulfur from the molten steel, a calculated mass $M_2$ of lime required to adjust a basicity of refining slag and a calculated mass $M_3$ of lime required to reach the mass of the final slag, and adding the $M_1$, the $M_2$ and the $M_3$, to obtain the addition amount M of the slagging lime during the LF refining, thereby predicting the addition amount of the slagging lime;

according to elemental mass conservation before and after sulfur removal, the mass $M_1$ of the lime required to remove the sulfur from the molten steel is obtained from the following Formula (7):

$$M_1 \cdot (\% \text{ CaO})/56 = G_m(w[S]_0 - w[S])/32 \qquad (7),$$

according to a basic basicity calculation formula, the calculated mass $M_2$ of the lime required to adjust the basicity of the refining slag is obtained from the following Formula (8):

$$R_1 = \frac{M_c(\%CaO)_c + (M_1 + M_2 + M_y) \cdot M_c(\%CaO) + M_l(\%CaO)_l + M_h(\%CaO)_h}{M_c(\%SiO_2)_c + M_l(\%SiO_2)_l + M_h(\%SiO_2)_h + M_{Si}}, \qquad(8)$$

according to the principle of material conservation, the calculated mass $M_3$ of the lime required to reach the mass of the final slag is obtained from the following Formula (9):

$$M_z(\% \text{ CaO})_z = M_3(\% \text{ CaO}) + [(M_1 + M_2 + M_y) \cdot (\% \text{ CaO})] + M_c(\% \text{ Cao})_c + M_h(\% \text{ CaO})_h + M_l(\% \text{ Cao})_l \qquad(9);$$

adding the $M_1$, the $M_2$ and the $M_3$ to obtain the addition amount M of the slagging lime during the LF refining from the following Formula (10), thereby completing prediction:

$$M = M_1 + M_2 + M_3 \qquad(10),$$

wherein, $w[S]_0$ is the mass percent of sulfur in the initial molten steel, in unit of %; $w[S]$ is the mass percent of sulfur in the molten steel at a smelting endpoint, in unit of %; $M_z$ is the mass of the final slag, in unit of kg; $M_h$ is the mass of the casting residue, in unit of kg; and $M_c$ is the mass of the converter tapping slag, in unit of kg; (% CaO) is a mass percent of CaO in the lime, in unit of %; $M_1$ is the mass of the lime required to remove the sulfur from the molten steel, in unit of kg; $G_m$ is the mass of the molten steel, in unit of kg; $M_2$ is the calculated mass of the lime required to adjust the basicity of the refining slag, in unit of kg; $M_l$ is a mass of pre-melting refining slag added during tapping, in unit of kg; $M_y$ is a mass of lime added during the tapping, in unit of kg; $M_3$ is the calculated mass of the lime required to reach the mass of the final slag, in unit of kg; $M_{Si}$ is a mass of silicon dioxide generated during ferrosilicon deoxidation, in unit of kg; (% CaO)$_c$ is a mass percent of CaO in the converter tapping slag, in unit of %; (% CaO)$_l$ is a mass percent of CaO in the pre-melting refining slag added during the tapping, in unit of %; (% CaO)$_h$ is a mass percent of CaO in the casting residue, in unit of %; (% CaO)$_z$ is a mass percent of CaO in the final slag, in unit of %; (% SiO$_2$)$_c$ is a mass percent of SiO$_2$ in the converter tapping slag, in unit of %; (% SiO$_2$)$_l$ is a mass percent of SiO$_2$ in the pre-melting refining slag added during the tapping, in unit of %; (% SiO$_2$)$_h$ is a mass percent of SiO$_2$ in the casting residue, in unit of %; and $R_1$ is a basicity of a target refining slag and is calculated by a thermodynamic simulation.

2. A ladle furnace (LF) refining method, comprising the following steps:

S1: acquiring initial parameters of LF refining;

S2: pre-processing the initial parameters, and correcting error data therein;

S3: predicting the addition amount of the slagging lime by using a prediction method for predicting an addition amount of a slagging lime during ladle furnace (LF) refining;

S4: starting the LF refining according to a prediction result, and continuously acquiring refining parameters during the LF refining; and S5: determining whether a mass percent of sulfur in a molten steel at a refining endpoint is qualified;

if the mass percent of the sulfur is qualified, performing a wire-feeding operation till completion of the LF refining; and if the mass percent of the sulfur is unqualified, iterating refining parameters at the refining endpoint to the parameters in S1 to take as new initial parameters, and repeating the above steps;

wherein the prediction method comprises:

calculating an actual sulfur distribution ratio in combination with a Kungliga Tekniska Högskolan (KTH) model and a least square method by using LF refining parameters, wherein the LF refining parameters comprise a mass percent of each component in a target slag and a mass percent of each component in a target molten steel during LF refining;

calculating a mass of a final slag by using the LF refining parameters and the actual sulfur distribution ratio; and calculating the addition amount of the slagging lime during the LF refining by using the LF refining parameters and the mass of the final slag, thereby predicting the addition amount of the slagging lime;

the actual sulfur distribution ratio is calculated with the following steps:

defining a formula for a sulfur distribution ratio, as shown in Formula (1):

$$L_S = \frac{w(S)}{w[S]}, \qquad(1)$$

wherein, $w[S]$ denotes a mass percent of sulfur in a molten steel, in unit of %; $w(S)$ denotes a mass percent of sulfur in a slag, in unit of %; and $L_S$ denotes the sulfur distribution ratio;

denoting a sulphide capacity with Formula (2) in the KTH model:

$$C_S = \exp\left\{-\frac{\Delta G^\theta}{RT}\right\} \cdot \left\{\frac{a_{o2}}{f_{s2-}}\right\} = \exp\left\{-\frac{\Delta G^\theta}{RT}\right\} \cdot \exp\left\{-\frac{\zeta}{RT}\right\}, \qquad(2)$$

wherein, $C_s$ denotes the sulphide capacity; $\Delta G^\ominus$ denotes Gibbs free energy and is indicated as $\Delta G^\ominus = 118535 - 58.8157 \cdot T$, in unit of J/mol; R denotes gas constant and is 8.314 (J/mol·K); ζ denotes a function of a single component with respect to a temperature in case of no interaction between components: $f_{s^{-2}}$ denotes an activity coefficient of sulfur in the slag; and $a_{o^{2-}}$ denotes an activity of oxygen in the slag;

defining a relation between a steel-slag sulfur equilibrium distribution ratio $L_S'$ and Cs, as shown in Formula (3):

$$lg L_S' = lg \frac{w(S)}{w[S]} = -\frac{935}{T} + 1.375 + lg f_S + lg C_s - lg a_{[O]}, \quad (3)$$

wherein, $L_S'$ denotes a sulfur distribution ratio calculated with the KTH model; T denotes the temperature, in unit of K; $f_s$ denotes an activity coefficient of sulfur in the molten steel; $C_s$ denotes the sulphide capacity; and $a_{[O]}$ denotes an activity of oxygen in the molten steel; and correcting, by using the least square method, the sulfur distribution ratio calculated with the KTH model to obtain an actual sulfur distribution ratio calculation formula, as shown in Formula (4):

$$L_S = a + bR + cMI + dL_S' \quad (4),$$

wherein, $L_S$ denotes the sulfur distribution ratio; R denotes a basicity of a furnace slag; MI denotes a Mannesmann index of the furnace slag; a denotes a constant term; b denotes a weight coefficient of the basicity; c denotes a weight coefficient of the Mannesmann index; and d denotes a weight coefficient of the sulfur distribution ratio calculated by the KTH model;

wherein calculating the mass of the final slag by using the LF refining parameters and the actual sulfur distribution ratio comprises: calculating, according to a principle of sulfur mass conservation that a decreased amount of the sulfur in the molten steel equals to an increased amount of the sulfur in the slag, the mass of the final slag in combination of a mass percent of each component in an initial molten steel, the mass percent of each component in the target molten steel, a mass percent of each component in the final slag, a mass percent and a mass of each component in a casting residue, a mass percent and a mass of each component in a converter tapping slag, a mass of the molten steel and the actual sulfur distribution ratio;

a final slag mass calculation model comprises:

$$(w[S]_0 - w[S]) \cdot G_m = w(S) \cdot M_z - w(S)_h \cdot M_h - w(S)_c \cdot M_c \quad (5)$$

wherein, $w[S]_0$ is a mass percent of sulfur in the initial molten steel, in unit of %; w[S] is the mass percent of sulfur in the molten steel at a smelting endpoint, in unit of %; w(S) is the mass percent of sulfur in the final slag, in unit of %; $w(S)_h$ is a mass percent of sulfur in the casting residue, in unit of %; $w(S)_c$ is a mass percent of sulfur in the converter tapping slag, in unit of %; $G_m$ is the mass of the molten steel, in unit of kg; $M_z$ is the mass of the final slag, in unit of kg; $M_h$ is a mass of the casting residue, in unit of kg; and $M_c$ is a mass of the converter tapping slag, in unit of kg; and substituting the Formula (1) into the Formula (5) to obtain a final slag mass calculation formula, as shown in Formula (6):

$$M_z = \frac{(w[S]_0 - w[S]) \cdot G_m + w(S)_h \cdot M_h + w(S)_c \cdot M_c}{w[S] \cdot L_S}; \quad (6)$$

respectively obtaining, according to a principle of material conservation during the LF refining by using the LF refining parameters and the mass of the final slag, a mass $M_1$ of lime required to remove the sulfur from the molten steel, a calculated mass $M_2$ of lime required to adjust a basicity of refining slag and a calculated mass $M_3$ of lime required to reach the mass of the final slag, and adding the $M_1$, the $M_2$ and the $M_3$, to obtain the addition amount M of the slagging lime during the LF refining, thereby predicting the addition amount of the slagging lime;

according to elemental mass conservation before and after sulfur removal, the mass $M_1$ of the lime required to remove the sulfur from the molten steel is obtained from the following Formula 7):

$$M_1 \cdot (\% \text{ CaO})/56 = G_m(w[S]_0 - w[S])/32 \quad (7),$$

according to a basic basicity calculation formula, the calculated mass $M_2$ of the lime required to adjust the basicity of the refining slag is obtained from the following Formula (8):

$$R_1 = \frac{M_c(\%CaO)_c + (M_1 + M_2 + M_y)) \cdot M_c(\%CaO) + M_l(\%CaO)_l + M_h(\%CaO)_h}{M_c(\%SiO_2)_c + M_l(\%SiO_2)_l + M_h(\%SiO_2)_h + M_{Si}}, \quad (8)$$

according to the principle of material conservation, the calculated mass $M_3$ of the lime required to reach the mass of the final slag is obtained from the following Formula (9):

$$M_z(\% \text{ CaO})_z = M_3(\% \text{ CaO}) + [(M_1 + M_2 + M_y) \cdot (\% \text{ Cao})] + M_c(\% \text{ CaO})_c + M_h(\% \text{ CaO})_h + M_l(\% \text{ Cao})_l \quad (9)$$

adding the $M_1$, the $M_2$ and the $M_3$ to obtain the addition amount M of the slagging lime during the LF refining from the following Formula (10), thereby completing prediction:

$$M = M_1 + M_2 + M_3 \quad (10),$$

wherein, $w[S]_0$ is the mass percent of sulfur in the initial molten steel, in unit of %; w[S] is the mass percent of sulfur in the molten steel at a smelting endpoint, in unit of %; $M_z$ is the mass of the final slag, in unit of kg; $M_h$ is the mass of the casting residue, in unit of kg; and $M_c$ is the mass of the converter tapping slag, in unit of kg, (% CaO) is a mass percent of CaO in the lime, in unit of %; $M_1$ is the mass of the lime required to remove the sulfur from the molten steel, in unit of kg; $G_m$ is the mass of the molten steel, in unit of kg; $M_2$ is the calculated mass of the lime required to adjust the basicity of the refining slag, in unit of kg; $M_l$ is a mass of pre-melting refining slag added during tapping, in unit of kg; $M_y$ is a mass of lime added during, the tapping, in unit of kg; $M_3$ is the calculated mass of the lime required to reach the mass of the final slag, in unit of kg; $M_{Si}$ is a mass of silicon dioxide generated during, ferrosilicon deoxidation, in unit of kg; (% CaO)$_c$ is a mass percent of CaO in the converter tapping slag, in unit of %; (% CaO)$_l$ is a mass percent of CaO in the pre-melting refining slag added during the tapping, in unit of %; (% CaO)$_h$ is a mass percent of CaO in the casting residue, in unit of %; $(\% \ CaO)_z$ is a mass percent of CaO in the final slag, in unit of %; $(\% \ SiO_2)_c$ is a mass percent of $SiO_2$ in the converter tapping slag, in unit of %; $(\% \ SiO_2)_l$ is a mass percent of $SiO_2$ in the pre-melting refining slag added during the tapping, in unit of %; $(\% \ SiO_2)_h$ is a mass percent of $SiO_2$ in the casting residue, in unit of %; and $R_1$ is a basicity of a target refining slag and is calculated by a thermodynamic simulation.

3. The LF refining method according to claim 2, wherein the parameters comprise: inbound parameters, outbound parameters and production parameters;

the inbound parameters comprise a mass percent of each component in an inbound molten steel, the mass of the molten steel, the mass percent of each component in the converter tapping slag, the mass of the converter tapping slag, the mass percent of each component in the casting residue, and the mass of the casting residue;

the outbound parameters comprise the mass percent of each component in the target molten steel, and the mass percent of each component in the target slag; and the production parameters comprise a mass percent of each component in the lime, and a mass of the lime.

\* \* \* \* \*